3,337,367
ALUMINUM WELDING WIRES AND PROCESS FOR THE TREATMENT OF SAME
Raymond Chevigny and Henri Richaud, Chambery, and Roger Develay, Barberaz, France, assignors to Pechiney, Compagnie de Produits Chimiques et Electrometallurgiques, Paris, France
No Drawing. Filed Apr. 6, 1964, Ser. No. 357,779
Claims priority, application France, Apr. 8, 1963, 930,780
8 Claims. (Cl. 134—3)

This invention relates to the treatment of filler wires or welding rods used in the welding of aluminum or alloys of aluminum and it relates more particularly to filler wires of the type described which may be used to produce welds that are relatively free of flaws and dross.

As is well known, the difficulty in welding aluminum and alloys of aluminum resides in the defects by reason of the presence of flaws or dross in the welds. Such flaws, which are microporous in nature, appear in various forms. They may be spread uniformly in the strand of the weld or they may be localized therein. They sometimes appear in single strands made by a single welding stroke or a pass but they are more often found in welds formed of multiple strokes. Defects in the form of scales often result from the presence of slag from the molten metal.

These defects are to be found in various welding processes, such as oxyacetylene welding and inert-gas metal-arc welding, such as welding under inert gas with a tungsten electrode (TIG) or welding under inert gas with a metal electrode that functions as a filler metal (MIG). One of the main causes for the development of such defects stems from the surface defects of the welding wire used as a filler.

These objections have been alleviated in part by a process wherein the surface of the filler wire is cleaned by treatment in a bath in the form of a solution of sodium zincate whereby zinc deposits on the surface of the filler wire of aluminum or alloy of aluminum by chemical displacement and thereafter the zinc deposit is removed by solution in a bath of nitric acid. The foregoing treatment only partially solves the problem, even when the treatment is repeated several times. While some improvement is experienced by comparison with untreated filler wires, the welds that are secured still contain some flaws.

It is an object of this invention to produce and to provide an improved welding rod or filler wire of aluminum or alloy of aluminum which can be used for welding aluminum or alloy of aluminum with material reduction, as in complete elimination of flaws and scales of the type heretofore experienced in such welding operations, and it is a related object to provide a new and improved method for the treatment of filler wires of aluminum or alloy of aluminum for accomplishing same.

In accordance with the practice of this invention, a filler wire of aluminum or alloy of aluminum is treated on its surface with a solution containing tin ions as derived from tin present in the anion or cation of a soluble salt, whereby tin forms on the filler wire by chemical displacement reaction after which it is dissolved in an acid bath, such as a solution of nitric acid and preferably a bath formed of the combination of chromic acid and sulphuric acid.

In the preferred embodiment of the invention, the tin is made available from a salt in which the tin is in the cation, such as in a stannous salt as represented by stannous sulphate, stannous fluoride or a mixture of stannous sulphate and stannous fluoride or in which the tin is in the anion, such as in a stannate as represented by sodium stannate. In the preferred practice of the invention, the acid bath for solution of the tin is formulated of the combination of sulphuric acid and chromic acid.

The following examples are given by way of illustration of the invention, but not by way of limitation:

*Example 1*

Composition of the filler wire:

| | Percent |
|---|---|
| Magnesium | 3.57 |
| Manganese | 0.30 |
| Chromium | 0.24 |
| Iron | 0.30 |
| Silicon | 0.11 |
| Titanium | 0.085 |

Aluminum, making up to 100%.

*Procedure.*—A billet having the above composition is drawn from a diameter of 300 mm. to a bar of about 12 mm. and then the bar of 12 mm. is drawn down to a wire of 1.59 mm.

The formed wire is first subjected to cleaning by degreasing in a conventional alkaline bath for 2 minutes at 80° C. and then rinsed in water. The clean wire is pickled for 5 minutes at 60–70° C. in a sulpho-chromic acid solution formulated of 150 cc. of sulphuric acid (60° Bé), 60 grams of chromic acid and 850 cc. of water, and it is then rinsed in water. The cleaned and pickled wire is then treated for 3–5 minutes at a temperature of 80–85° C. in a solution formed of 45 grams sodium stannate in one litre of water, as by immersion in the bath formed thereof, and then the treated wire is rinsed with water to remove residuals.

The filler wire, reacted in the bath of sodium stannate, is then immersed in a bath formulated of 150 cc. sulphuric acid (60° Bé), 50 grams of chromic acid and 850 cc. of water and then rinsed with water to remove residuals. The resulting treated wire is air dried and ready for use.

For purposes of comparison, filler wires of the same composition were treated in the manner heretofore employed with a solution consisting of 300 grams caustic soda and 75 grams zinc oxide in a litre of solution.

Identical welding tests, with one, three and six strokes, were carried out by MIG process using as the filler rods one group of untreated wires of the composition described, a second group of the same filler wires treated twice with the caustic soda and zinc oxide solution representing the process heretofore employed, and a third group of the same filler wires treated in accordance with Example 1. The resulting welding strands were examined by X-ray.

No flaws were found in the welds made with the wires of the third group. Flaws were marked and numerous in the welds formed with the wires of the first group, and some flaws of smaller dimension and of lesser frequency were found in the welds formed of the wires in the second group.

*Example 2*

After pickling, an aluminum filler wire analyzing 99.5% by weight of aluminum is treated for 2 minutes at 80° C. in a bath containing sodium stannate dissolved in water in an amount of 60 grams per litre. After removal and rinsing with water to remove residuals, the tinned aluminum filler wire is immersed for about 5 minutes at 60–70° C. in a bath composed of 80 cc. sulphuric acid, 50 grams chromic acid and 920 grams water.

Welding tests were carried out as in Example 1 and with the same results.

Example 3

After pickling, an aluminum filler wire (99.5% aluminum) is immersed for 1 minute at 25° C. in a bath having the following composition:

| | |
|---|---|
| Stannous sulphate _____ grams__ | 200 |
| Hydrofluoric acid (40% solution) _____ cc___ | 90 |
| Residual lye of cellulose bisulphate _____ grams__ | 0.2 |
| β-naphthol _____ do__ | 2 |
| Hydrolyzed gelatin _____ do__ | 1 |
| Water _____ litres__ | 1 |

After rinsing the treated wire with water, it is immersed in the solution of sulphuric acid and chromic acid of Example 1.

Welding tests, carried out as in Example 1, gave the same improvement for the wire treated as in Example 2.

The baths formulated of the tin salts, in accordance with the practice of this invention, have greater fluidity than the zincate baths heretofore employed with the result that less of the solution is retained on the treated filler wire with corresponding reduction in loss of salt in the materials that are washed away.

The bath containing the tin ion can be obtained by solution of the tin in any liquid in which the salt is soluble and ionizable and particularly in acid solutions, such as of nitric acid (40° Bé.), but better surface conditions are obtained from treatment in a solution of chromic and sulphuric acid. The acid concentration in the bath is not critical as long as enough acid is present to dissolve and ionize the tin salt. The amount of tin salt can be varied over a fairly wide range, such as from 5–30% salt in solution. The temperature and time relationship can also be varied, as illustrated in the examples.

While not equivalent, improvements in the characteristics of the welding rod or filler rod formed of aluminum or alloys of aluminum can also be achieved by treatment of the filler wire with a solution embodying the combination of zinc sulphate and hydrofluoric acid followed by treatment of the filler wire, after rinsing, with an acid such as nitric acid or preferably a solution of sulphuric and chromic acids.

The following examples are given by way of illustration, but not by way of limitation, of this latter concept of this invention:

Example 4

Composition of the filler wire:

| | Percent |
|---|---|
| Magnesium | 3.57 |
| Manganese | 0.30 |
| Chromium | 0.24 |
| Iron | 0.30 |
| Silicon | 0.11 |
| Titanium | 0.085 |

Aluminum, making up to 100%.

*Procedure.*—A billet of the foregoing composition is drawn down from 300 mm. diameter to a bar of 12 mm. in diameter. The 12 mm. bar is further drawn down by conventional wire drawing to a wire of about 1.59 mm. in diameter.

The filler wire is cleaned by washing for 2 minutes in a solution heated to a temperature of 80° C. and containing conventional alkaline cleaning agents to remove grease, dirt and the like, and the cleaned wire is then rinsed in water to remove residuals. The cleaned wire is pickled for 5 minutes at 60–70° C. in a bath of sulphuric acid and chromic acid formulated to contain 150 cc. of sulphuric acid (60° Bé.) and 60 grams of chromic acid per 850 cc. of water. After pickling, the wire is rinsed with water to remove residuals.

The cleaned and pickled wire is treated for 1 minute with a solution heated to a temperature of 25° C. and formulated to contain 720 grams of zinc sulphate and 25 cc. of 40% hydrofluoric acid per litre of water and the so treated wire is rinsed with water or other aqueous medium to remove the residuals.

The zincated wire, resulting from the foregoing treatment, is then exposed as by immersion or wetting with an acid solution formulated to contain 150 cc. of sulphuric acid (60° Bé.) and 50 grams of chromic acid per 850 cc. of water and then the treated wire is rinsed with water and air dried.

Welding tests similar to that of Example 1 were carried out to compare wire of the same composition without any treatment, wire of the same composition treated twice with zinc oxide and caustic soda solution, and wire of the same composition treated as in Example 4.

No flaws were found in welds formed with wires treated in accordance with Example 4; flaws were present in the welds formed with wire treated with caustic soda and zinc oxide, and the welds formed with untreated wire were full of flaws.

Example 5

Filler wire of 99.5% aluminum, treated and pickled as in Example 4, were treated by immersion for 1 minute in a 30° C. bath formulated to contain dissolved therein 150 grams of crystallized zinc sulphate, 15 cc. of 40% hydrofluoric acid per litre of water. After rinsing in water to remove residuals, the treated wire was wet as by immersion in a bath formed of 80 cc. of sulphuric acid (60° Bé.), 50 grams of chromic acid and 920 cc. of water. Treatment was carried out for 5 minutes at a temperature of 60–70° C. and the treated wire was washed in water and then air dried.

Welding tests similar to that of Example 4 were performed with the same results.

The baths of Examples 4 and 5 are more fluid than sodium zincate baths presently employed. As a result, less of the bath is carried out with the wire for subsequent removal and loss during the washing or rinsing steps.

The time and temperature of treatment with the zinc sulphate and hydrofluric acid solution is not critical and can be varied over a fairly wide range, but it is preferred to make use of a temperature less than boiling point temperature and preferably less than 40° C.

With a bath composition of 500 grams of zinc sulphate and 45 cc. of 40% hydrofluoric acid per litre of water, a temperature as low as 20° C. can be used for the same duration. The time can be varied but it is preferred to provide for a treatment of more than 1 minute in duration, and while more than 5 minutes can be employed, it is unnecessary to exceed treatment for more than 5 minutes in duration. The concentration of the ingredients in the bath can be varied over a fairly wide range but it is desirable to make use of a bath containing more than 10% zinc sulphate and 5% hydrofluoric acid and it is preferred to make use of a bath containing from 15–75% zinc sulphate and 5–10% by weight hydrofluoric acid.

Dissolution of zinc deposited by treatment onto the surfaces of the filler wire can be achieved by any of the well known inorganic acids, such as nitric acid and the like, but it is preferred to make use of a solution formed of sulphuric acid and chromic acid.

The wires produced in accordance with the practice of this invention can be protected to prevent uncontrolled oxidation with elements in the atmosphere. For this purpose, the treated filler wire can be subjected to slight oxidation which is carefully controlled, as by exposure to water vapor or by treatment in water adjusted to a basic pH.

Invention exists not only in the method of treatment to improve the filler wire but invention exists also in the new and improved filler wire of aluminum or alloys of aluminum produced in accordance with the process of this invention.

It will be understood that changes may be made in

We claim:

1. A process for the treatment of welding wire of aluminum and alloys of aluminum to improve the character of the welds derived therefrom in the welding of aluminum and alloys of aluminum, comprising the steps of immersing the surfaces of the wire in a solution containing an ionizable salt of tin whereby a tin coating is formed and then immersing said wire in a solution of an acid to remove said tin coating.

2. A process for the treatment of welding wire of aluminum and alloys of aluminum to improve the character of the welds derived therefrom in the welding of aluminum and alloys of aluminum, comprising the steps of immersing the surfaces of the wire in a solution containing an ionizable salt of tin dissolved therein in an amount within the range of 5–30% by weight whereby a tin coating is formed and then immersing said wire in a solution of an acid to remove said tin coating.

3. The process as claimed in claim 2 in which the treatment of the wire with a solution of a tin salt is carried out at a temperature above room temperature but below the boiling point temperature.

4. The process as claimed in claim 2 in which the ionizable salt is selected from the group consisting of sodium stannate, stannous sulphate and stannous fluoride.

5. The process as claimed in claim 2 in which the acid solution is formed of nitric acid.

6. The process as claimed in claim 2 in which the acid solution is a mixture of sulphuric acid and chromic acid.

7. The process as claimed in claim 2 which includes the step after treatment with acid and drying of slightly oxidizing the surfaces of the treated wire under controlled oxidation.

8. A welding wire produced by the method of claim 2.

References Cited

UNITED STATES PATENTS 2,569,030  9/1951  Van den Berg _____ 134—3

ALFRED L. LEAVITT, *Primary Examiner.*

J. R. BATTEN, JR., *Assistant Examiner.*